United States Patent [19]

Carter

[11] 4,272,218
[45] Jun. 9, 1981

[54] APPARATUS FOR TRANSPORTING A WHEELCHAIR UPON AN AUTOMOBILE

[76] Inventor: Robert A. Carter, 611E N. 16th St., Phoenix, Ariz. 85006

[21] Appl. No.: 955,892

[22] Filed: Oct. 30, 1978

Related U.S. Application Data

[63] Continuation-in-part of Ser. No. 850,188, Nov. 10, 1977, abandoned.

[51] Int. Cl.³ ............................................. B60R 9/00
[52] U.S. Cl. .................................. 414/462; 224/310; 414/546; 414/569
[58] Field of Search ............... 414/546, 555, 569, 462, 414/466, 921; 9/31, 35, 36, 37, 38, 39; 224/309, 310, 324

[56] References Cited

U.S. PATENT DOCUMENTS

| | | | |
|---|---|---|---|
| 2,411,821 | 11/1946 | Choat | 414/546 X |
| 4,039,096 | 8/1977 | McAllister | 414/462 |
| 4,134,509 | 1/1979 | Clement | 414/462 |

FOREIGN PATENT DOCUMENTS 257413  5/1963  Australia ................................. 414/546

*Primary Examiner*—Frank E. Werner
*Attorney, Agent, or Firm*—Joseph H. Roediger

[57] ABSTRACT

Apparatus to be mounted on a cartop for raising a wheelchair from the driver's seat and orienting and engaging the wheelchair for transport on the roof. The supporting base is mounted on the roof with an overlying frame rotatably mounted to the base above the driver's position. The frame is biased to rotate outwardly of the car and a cable is used to raise the wheelchair, engage the frame for rotation and change the attitude of the chair so that it is flat-lying and engaged by the frame for transport.

12 Claims, 10 Drawing Figures

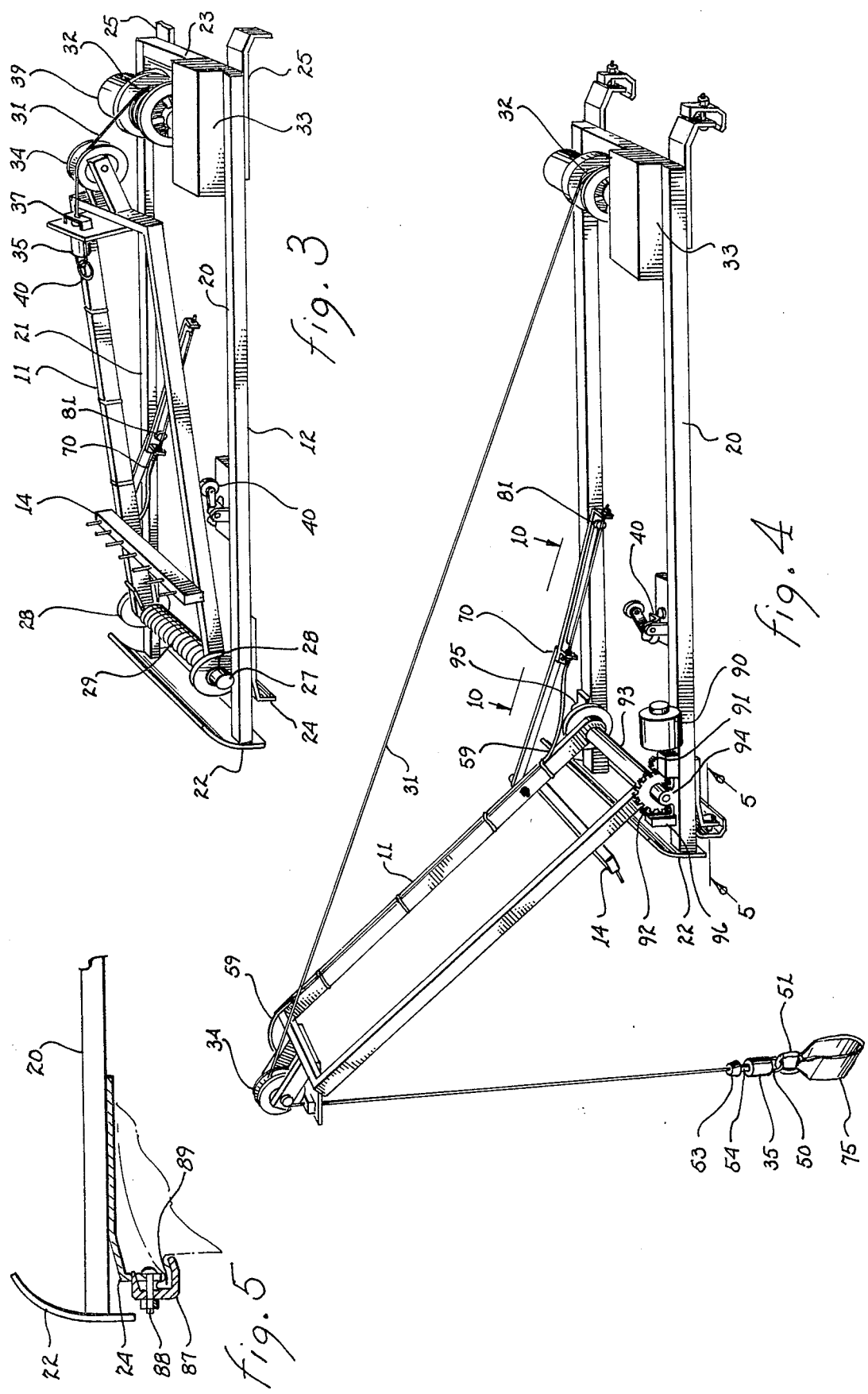

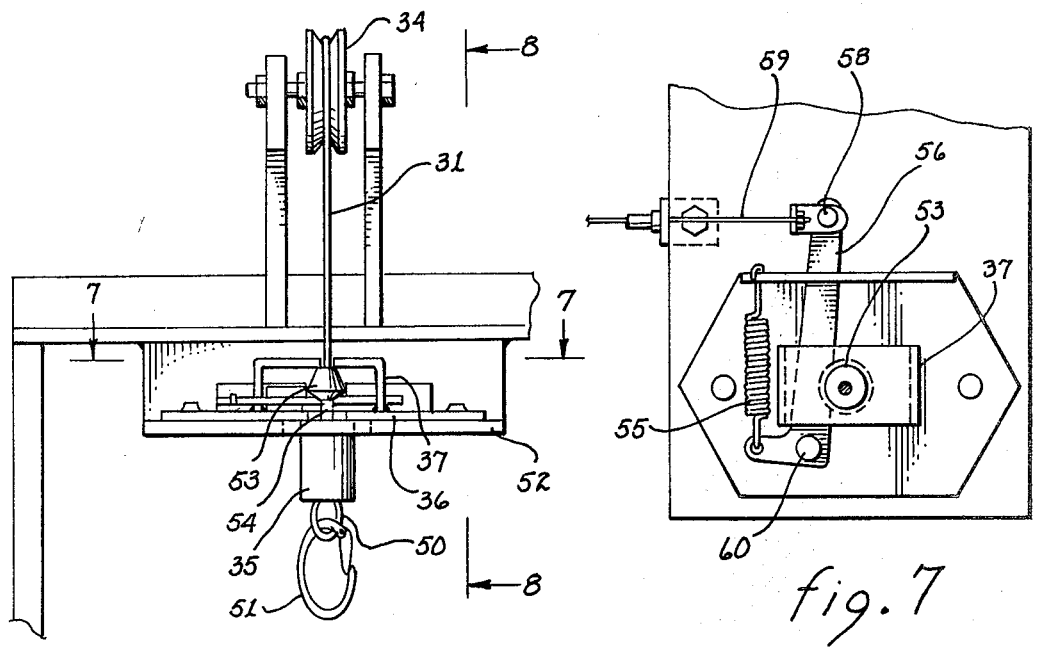
fig. 6
fig. 7
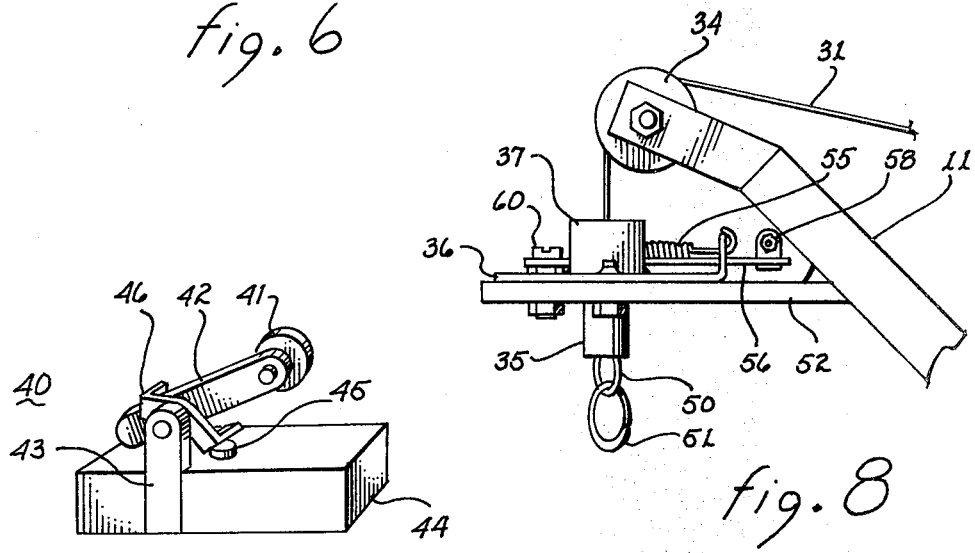
fig. 8
fig. 9
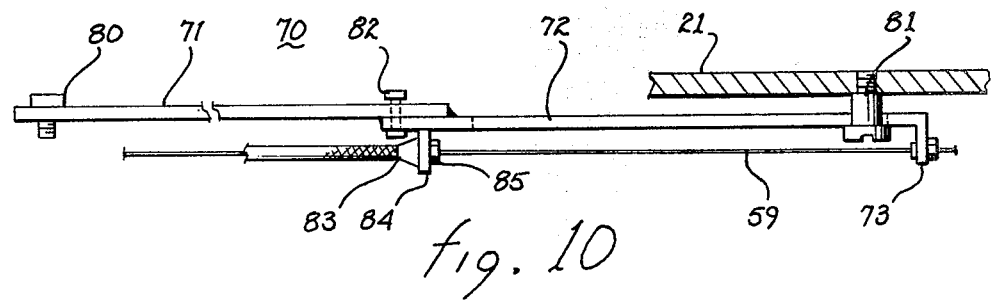
fig. 10

APPARATUS FOR TRANSPORTING A WHEELCHAIR UPON AN AUTOMOBILE

This is a continuation-in-part of copending application Ser. No. 850,188, filed Nov. 10, 1977, now abandoned.

BACKGROUND OF THE INVENTION

This invention relates to transport apparatus for a wheelchair on the roof of an automobile. The large number of invalids operating automobiles has generated substantial interest in devices which can be placed on a standard automobile and operated by the invalid without assistance for mounting a wheelchair for transport and retrieving it unaided at the destination.

The advent of the collapsible travelling wheelchair has facilitated invalid travel, but the use of rear carriers or trunk and rear seat stowage presume that the invalid is being assisted both at point of departure and at point of destination. This is a severe restriction on the freedom of the disabled person to travel. Consequently, small trucks and vans have been built with platforms that raise and lower the person so that he may wheel himself within and without the van. These accommodations are quite expensive.

Consequently, the need for a wheelchair stowing and transport apparatus that can be utilized with the standard commercially available automobile has arisen. Among the differing approaches to raising articles to the roof top of an automobile for transport are the car-top crane hoists shown in U.S. Pat. Nos. 3,608,759 and 3,952,893 wherein the boom of the crane extends a considerable distance outwardly of the car and then rotates to deposit the article on the car roof. These type of devices require a substantial area between the automobile and any adjacent vehicle. Thus, they are not generally suitable for use in parking lots. Other types of car top carriers such as shown in U.S. Pat. Nos. 3,531,006 and 3,139,203 are operational from the rear of the vehicle and thus are incapable of use by an unaccompanied invalid who must stow his wheelchair and then make his way to the operator's seat of the automobile.

One type of device that has recognized these problems is the side-hinged basket carrier disclosed in U.S. Pat. No. 3,878,955 wherein a frame structure extends across the automobile roof top and down the side thereof. The basket carried on the top of the vehicle is supported by arms extended halfway down the side of the vehicle and this basket swings outward of the vehicle at the driver's side. Since the frame structure is extensive and utilizes the side of the vehicle, the rear door of the conventional four-door vehicle is incapable of utilization. However, the present invention is directed to a wheelchair transport device that is contained on the roof of the vehicle and does not extend outwardly of the vehicle to the point where it can not be utilized in parking lots. As a result, the invalid is able to park and depart from his vehicle in normal commercial parking facilities.

SUMMARY OF THE INVENTION

This invention relates to apparatus for raising and lowering a wheelchair from a position adjacent the operator's seat of a motor vehicle to an engaged position on the roof of the vehicle.

The apparatus includes a supporting base which is mounted in a fixed position on the roof. The supporting base extends transversely on the roof with a first edge portion proximate to the drivers's side of the vehicle. A frame member having first and second ends is rotatably mounted to the supporting base. The first end of the frame is mounted adjacent the first edge portion of the base to permit rotation from an overlying position on the vehicle roof to a position with its second end extending over the driver's entrance to the vehicle.

The second end of the frame member has a cable guide means affixed thereto. A support cable is provided which extends through the guide means with a free end being adapted for attachment to the wheelchair. The opposing end of the support cable is connected to a cable reel means mounted on the supporting base or frame member of the apparatus. The actuation of the cable reel means by an electric motor causes the cable to move through the guide means. A stop means is secured to the support cable near the free end to limit the movement of the cable through the guide means when the reel means is actuated.

Also, drive means is provided for rotating the frame member between the transport position wherein the wheelchair and the frame member are in an overlying position on the vehicle roof and an extended position wherein the second end of the frame member extends upwardly and outwardly of the driver's entrance to the vehicle. An engaging means is mounted between the first and second ends of the frame member for engaging the wheelchair as it is moving into its transport position on the vehicle roof and maintaining the wheelchair in the transport position.

In operation, the driver takes the wheelchair to the driver's entrance and seats himself within the vehicle. Then, the driver actuates the cable reel means to permit the support cable to be unwound therefrom. The drive means causes the frame member to rotate about the first end thereof to a position wherein the second end is above the driver's entrance. The cable reel means continues to be actuated and the free end drops adjacent the seated driver so that it may be connected to the folded wheelchair.

After attachment to the wheelchair the direction of rotation of the cable reel means is reversed by the operator and the wheelchair is raised until the stop means encounters the cable guide means. At this point the cable does not continue feeding through the guide means and the frame member starts to rotate about its first end.

As the frame member rotates to the overlying position, the wheelchair swings into contact with the first edge portion of the base member so as to encounter the engaging means. The wheelchair reaches the overlying position and is maintained for transport by the engaging means. When it is necessary for the driver to retrieve the wheelchair, the direction of rotation of the cable reel means is again reversed and the frame is rotated to its open position. Thus, the present invention permits the disabled driver to have ready access to his wheelchair which is stowed for transport upon the roof of his vehicle without requiring the aid or assistance of other parties.

Further features and advantages of the invention will become more readily apparent from the following detailed description of specific embodiments when taken in conjunction with the accompanying drawings.

BRIEF DESCRIPTION OF THE DRAWINGS

FIG. 3 shows one embodiment of the invention in the transport position.

FIG. 4 shows a second embodiment of the invention in the open position.

FIG. 5 shows in detail the attachment of the base member to an automobile taken along line 5—5 of FIG. 4.

FIG. 6 is an end view of the cable guide and cable stop.

FIG. 7 is a top view taken along line 7—7 of FIG. 6.

FIG. 8 is a side view of the cable guide taken along line 8—8 of FIG. 6.

FIG. 9 shows the switch mounted on the support base.

FIG. 10 shows the limit means taken along line 10—10 of FIG. 4.

DESCRIPTION OF THE PREFERRED EMBODIMENTS

Figure 1:
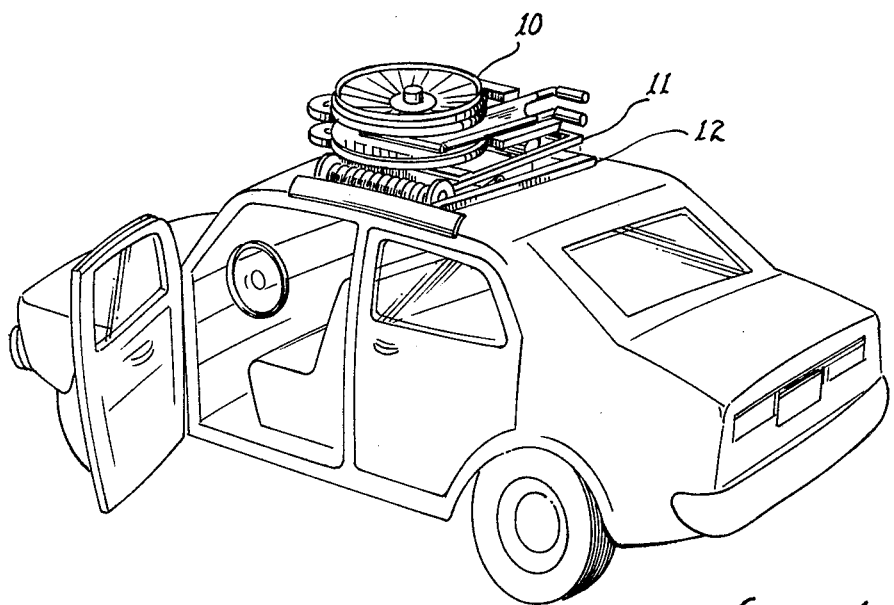
FIG. 1 is a view in perspective of an automobile with the invention engaging a wheelchair in the transport position.

Referring now to FIG. 1, a four-door automobile is shown with the present invention mounted thereon and with a conventional collapsible wheelchair 10 secured in the transport position. The wheelchair is maintained in this position overlying the roof of the automobile by the engaging means 14, shown in FIG. 2, attached to frame member 11 of the apparatus.

Figure 2:
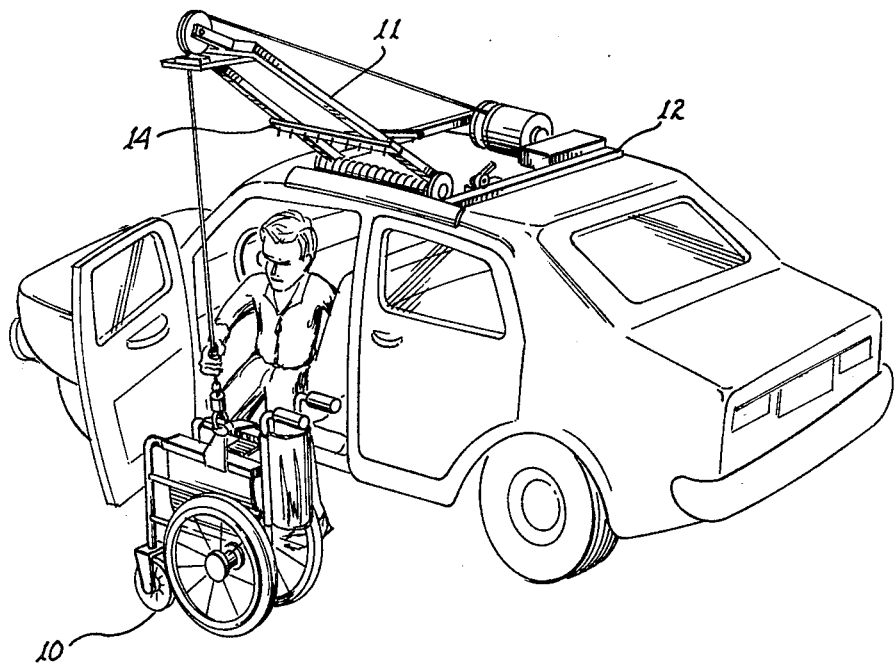
FIG. 2 is a view in perspective showing the wheelchair of FIG. 1 in a lowered position.

In FIG. 2, the wheelchair 10 is in the lowered position proximate to the disabled vehicle operator with frame member 11 extending outwardly of the vehicle by a distance sufficient to permit the wheelchair to be raised and lowered without interference from the automobile. Also, the frame member 11 outward extension is limited so that the wheelchair is within reach of the disabled operator and thus does not interfere with other adjacently spaced vehicles such as would be encountered in a typical commercial parking facility.

As shown in FIGS. 1 and 2, the invention is mounted on the roof of the automobile and does not restrict or limit the use of the doors for normal purposes. Consequently, the carrying capacity of the vehicle is not reduced and the disabled operator can place packages in the rear seat of the vehicle. The operation of the rotatably mounted frame member is controlled by a conventional electric motor having reversing capability. The motor is normally a d.c. motor utilizing the vehicle storage battery for power. The on-off and reversing switches to control motor operations are of conventional type and positioned within the vehicle to be within reach of the operator. In one embodiment of the invention, a Black & Decker one horse-power d.c. motor was utilized to control the attitude and position of the rotatably mounted frame member 14 in the manner later described in detail. The remote controls were placed on the front seat of the vehicle.

The embodiment shown installed on the vehicle roof in FIGS. 1 and 2 is shown in further detail in FIG. 3 wherein supporting base 12 is noted to include first and second transverse members 20 and 21 which extend across the vehicle roof. Members 20 and 21 are rigidly secured by first and second edge members 22 and 23. First edge member 22 is provided with a curved surface to facilitate the movement of the wheelchair to and from the transport position and to aid in the engagement of the wheelchair by engaging means 14. Spaced from the first edge member 22 of base 12 and attached to the underside of transverse members 20 and 21 are depending flange members 24.

Also, located at the second or opposing end of each of the transverse members are depending flange members 25. Flange members 24 and 25, as shown in FIG. 5, cooperate with additional elements to secure the present invention to the vehicle roof.

The supporting base 12 has a moveable frame 11 rotatably mounted thereon adjacent the first edge member 22. A shaft 27 to which frame member 11 is affixed is journalled in bearings 28 attached to the transverse members 20 and 21 of supporting base 12. The shaft 27 passes through a heavy-duty spring 29 which biases the frame member 11 to an open position wherein it extends outwardly of the vehicle. This biasing force is controlled by the restraining force exerted on apertured base plate 36 secured to frame member 11 by cable stop 35 affixed to the free end of cable 31.

In the embodiment shown, a drive motor 33 is mounted on the supporting base 12 and has cable take-up reel 32 operatively connected to its drive shaft. The cable reel is journalled in bearing 39 secured to transverse member 21 and has wire cable 31 about its drum. One end of cable 31 is secured to cable reel 32. The opposing or free end passes over cable guide 34, through lock mechanism 37 and apertured base plate 36 and is attached to the free end of the cable. In other embodiments of the invention, the drive motor 33 and cable take-up reel 32 can be positioned on the supporting base 12 proximately to the driver's position in the vehicle or on the frame member 11. The location of the cable take-up reel on the frame reduces the period of operation since the amount of cable being wound is reduced. This reduces the power requirements of the apparatus and the load on the vehicle battery.

As shown in FIG. 3, the motor 33 has been actuated by the operator within the vehicle and the cable stop 35 is against the apertured base plate 36. The biasing force of spring 29 is overcome by the tension force applied to the cable 31 by the rotation of take-up reel 32. Consequently, the frame 11 is moving to the flattened or transport position. To insure that motor 33 ceases to rotate the take-up reel when frame member 11 achieves the transport position, a limit switch 40 is shown mounted proximate to transverse member 20. Referring to FIG. 9, switch 40 includes a roller 41 journalled in pivot arm 42 which is journalled in support post 43. The support post is attached to housing 44 and transverse member 20 as noted in FIG. 3. Housing 44 contains a pressure switch which is electrically connected to the drive motor control so as to remove the vehicle battery from the motor drive circuit when actuated. The contact portion 46 of the switch normally extends beyond the surface of the housing. As the frame member moves into the transport position it engages roller 41 driving it down, thereby causing the flange of arm 46 to depress the contact portion and disable the motor drive circuit. To move the frame member to the extended position of FIG. 4, the operator need only utilize the reversing switch on his remote control. In embodiments wherein the cable take-up reel and motor are located proximate to the first edge of the supporting base or on the rotatable frame member, the limit switch is located on the support 52 and is contacted by cable stop 35 for deactivation.

The constructional features of the cable stop 35, apertured base plate 36 and locking mechanism 37 are shown in FIGS. 6, 7 and 8. Referring first to FIG. 6, the cable 31 extends over cable guide reel 34 through the apertures in locking mechanism 37 and base plate 36. The cable extends through cable stop 35 and terminates in a loop 50 to which a clip 51 is attached. The apertured base plate 36 is mounted on support 52 which is attached to the frame 11. Support 52 contains an aperture which is greater in diameter than the largest diameter of stop 35.

The cable stop 35 includes an uppermost portion 53 of reduced diameter tapered cross-section and a second reduced diameter portion 54 between the large diameter stop and the uppermost portion. The cable stop is provided by the interaction of large diameter stop 35 and base plate 36 having an aperture of smaller diameter. The actuation of the motor urges the stop against the base plate to overcome the bias of the spring and cause the frame to move to the transport position. The other portions 53 and 54 of the cable stop extend through the base plate 36 to provide a locking in place of the cable free end. The engagement of cable stop 35 with base plate 36 and the attachment of support 52 to frame 11 is shown more clearly in FIG. 8.

In addition, FIGS. 7 and 8 show the locking mechanism within locking housing 37 as including a detent member 56 which is rotationally mounted to support plate 52 by bolt 60 which serves as a pivot point. Spring 55 connects one end of detent member 56 to locking housing 37 as shown with the long extension or detent arm extending through housing 37 to a cable attachment 58. The cable 59 runs to a limiting means 70 connected between transverse member 21 of the supporting base and the frame member 11 as is noted in greater detail in FIGS. 4 and 10. As the cable stop 35 contacts base plate 36, the detent 56 engages the reduced diameter portion 54 and is urged thereagainst by spring 55. The stop 35 is maintained in this position until cable 59 applies a tension force at attachment 58 sufficient to overcome the bias force of spring 55. This results in a retraction of the detent 56 and no longer locks the cable stop 35 against base plate 36.

The invention is shown in the operational position of FIG. 2 in the detailed drawing of FIG. 4 wherein the three portions 53, 54, 35 of the cable stop are readily apparent. A sling 75 is shown attached to cable loop 50 by clip 51. The sling is normally used to accommodate the handles of a collapsible wheelchair. In this position, the frame 11 extends upwardly and outwardly of the vehicle as noted in FIG. 2. In the embodiment of FIGS. 1, 2 and 3, the operator wanting to retrieve his wheelchair from the transport position on top of the vehicle reverses the motor 33 and turns it on. The cable 31 unwinds from reel 32 due to the bias force of spring 29. The extended position of frame 11 is limited by the action of limiting means 70 which comprises first and second rigid arms 71 and 72 having their free end attached to frame 11 and transverse member 21 respectively as shown by bolts 80 and 81 in FIG. 10. Arms 71 and 72 are joined together by pivot pin 82 which permits rotation thereabout. Arm member 72 is shown in FIGS. 4 and 10 as slotted with bolt 81 extending through the slot and acting as a guide. In FIG. 4 the frame member extends upward and outward of the vehicle and bolt 81 is at one extreme of the slot in arm member 72 thereby limiting the outward extension of frame 11. Also, the end 83 of the sheath of cable 59 is affixed to flange 84 of arm member 72 by fastener 85 with the end cable 59 being adjustably fastened at flange 73 of arm member 72 by fastener 85 with the end of cable 59 being adjustably fastened at flange 73 of arm member 72. The movement of the frame 11 to the transport position causes arm member 72 to slide along the path defined by the slot and bolt 81 to the final position shown in FIG. 3. As noted bolt 81 and slotted arm 72 operate to limit the extended and transport positions of the frame.

In addition, the cable 59 as shown in FIGS. 3 and 4 is secured to the side of frame 11 and as the frame moves to the extended position tension in the cable between the end secured at flange 73 and the end secured to detent member 56 increases. As a result, the detent member retracts from engagement with the reduced diameter portion of cable stop 35 and the cable stop is released from engagement by the locking mechanism. The adjustment of the tension is cable 59 at flange 73 at installation enables the cable stop to be released at or just prior to the frame reaching the extended position shown in FIG. 4. The continued operation of the motor 33 by the operator causes the cable stop 4 and the attached wheelchair to be lowered to the disabled vehicle operator.

The supporting base of the invention including transverse members 20 and 21 and members 22, 23 is mounted on the portion of the roof overlying the front seat of the vehicle and secured by downwardly depending flange members 24 and 25. The securing of these members is shown in detail in FIG. 5 wherein one of the flange members 24 spaced inwardly of the curved edge member 22 is shown in cross section secured to the curved run-off edge 89 of the vehicle roof by clamp 87 which is held in position by fastener 88. The apparatus is placed on the vehicle with the flange extending behind the edge 89. A portion of the clamp 87 extends under edge 89 and by tightening the fastener 88 a removable vehicle attachment is made. Similar attachments are made at flanges 25 which depend downwardly from the second edge member 23. If desired, the apparatus could be bolted directly to the vehicle roof. However, the curvature of most vehicle roofs makes the raised attachment shown in FIG. 5 preferable.

The embodiment of FIG. 4 includes a second d.c. motor 90 in place of the spring 29 of FIG. 3 and the cable take-up reel is located proximate to the second edge of the supporting base. The motor 90 drives gear 91 which is enmeshed with frame gear 92 connected to the frame rotation shaft 93. The ends of shaft 93 are journalled in bearings 94 and 95 to permit rotation of the frame 11 in the same manner as previously discussed in connection with the embodiment of FIG. 3. The motor 90 is electrically coupled to the vehicle battery and is actuated and reversed by the operator's controls within the vehicle. As the frame contacts switch 40, both motors are disabled until the operator presses the reversing switch on his controls. At this time, motor 90 elevates the frame while motor 33 causes the cable 31 to be played out. When the frame 11 reaches the extended position, switch 96 located on the inside of transverse member 20 deactivates motor 90 so that the operator then can lower the wheelchair by controlling motor 33 as with the embodiment of FIG. 3. Switch 96 is similar to switch 40 previously described in connection with FIG. 9.

Both embodiments of the invention include the engaging means 14 mounted on frame member 11. The engaging means includes a bar extending between the sides of frame 11 with a number of spaced tines thereon. The engaging means is preferably formed as a unitary piece from a resilient material and is positioned on the frame between its ends so as to extend between the spokes of the wheelchair as it is moved to the transport position on the vehicle roof.

In operation, the disabled driver wheels himself to the driver's side of the vehicle and transfers himself from the chair into the driver's seat. The controls are activated to lower the clip provided on the free end of the cable. The sling is wrapped about the arm rests of the collapsed chair. The reversing switch is used to cause the cable to lift the chair until the cable stop is engaged by the locking mechanism. Then the frame moves to the transport position and the wheelchair, spaced from the vehicle by the curved end or deflection panel of the supporting base, moves against the frame with the tines of the engaging means extending through the wheel spokes of the chair. The frame continues to be lowered until the switch 40 disables the power supply from the battery at which time the wheelchair is held by the locking mechanism and the tines of the engaging means for transport.

While the above description has referred to specific embodiments of the invention it will be apparent that many variations and modifications may be made therein without departing from the spirit and scope of the invention.

What is claimed is:

1. Apparatus for raising an article from a ground position to an engaged position for transport upon the roof of a motor vehicle which comprises:
   (a) a supporting base adapted for mounting upon the roof of the motor vehicle, said supporting base having a first edge portion proximate to one side of the motor vehicle and an opposing second edge portion;
   (b) a frame member having a first end and a second end, the first end being rotatably mounted to the supporting base adjacent the first edge portion;
   (c) cable guide means affixed to the second end of said frame member;
   (d) a support cable extending through said guide means and having a free end adapted for attachment to the article, and an opposing end;
   (e) stop means secured to said support cable for preventing movement of the free end of said cable through the guide means;
   (f) cable reel means attached to said apparatus for receiving the opposing end of said support cable, the actuation of said cable reel means causing an attached article to change elevation, the movement of cable through said guide means being limited by the stop means;
   (g) drive means for rotating the frame member between a transport position overlying the vehicle roof and an extended position with the second end thereof extending outwardly of the motor vehicle; and
   (h) engaging means mounted between the first and second ends of said frame member for engaging the article as said frame member is being rotated to the transport position.

2. Apparatus in accordance with claim 1 further comprising limiting means connected between the supporting base and the frame member for limiting the rotation of the second end of said frame member outwardly of the vehicle.

3. Apparatus in accordance with claim 2 wherein said drive means for rotating the frame member includes a motor mounted on the supporting base proximate to the first edge thereof, said frame member including means mounted proximate to the first end thereof for engaging said motor.

4. Apparatus in accordance with claim 3 further comprising switch means mounted on the supporting base so as to contact the frame member when said member is in the transport position for terminating actuation of said drive means.

5. Apparatus in accordance with claim 4 wherein said cable guide means includes an apertured base plate through which support cable passes and a detent member, said stop means having a receiving portion for engaging said detent member to thereby secure the elevated position of the article; and said apparatus further comprising means for releasing said detent member.

6. Apparatus in accordance with claim 5 further comprising a limit switch mounted on said cable guide means for contacting said stop means and terminating actuation of said cable drive means.

7. Apparatus in accordance with claim 6 wherein the first edge portion of said supporting base includes a curved deflection surface.

8. Apparatus in accordance with claim 7 further comprising first and second securing means adapted to secure the first and second edge portions of the supporting base to the roof of the motor vehicle.

9. Apparatus in accordance with claim 8 further comprising control means for actuating said cable means located within said motor vehicle.

10. Apparatus in accordance with claim 9 wherein said engaging means includes a support bar extending transversely across said frame member, the support having a plurality of tines spaces thereacross to facilitate the engaging of the article in the transport position.

11. Apparatus in accordance with claim 10 further comprising switch means mounted on the supporting base so as to contact the frame member when said member is in the transport position for terminating actuation of said cable reel means.

12. Apparatus in accordance with claim 2 wherein said drive means for rotating the frame member includes a biasing means operatively connected between the first edge portion of the supporting base and the first end of the frame member, said biasing means urging the frame member against the limiting means.

* * * * *